United States Patent
Krieger et al.

(10) Patent No.: US 11,316,567 B2
(45) Date of Patent: Apr. 26, 2022

(54) UPLINK CONTROLLED RESOURCE ALLOCATION FOR DISTRIBUTED ANTENNA SYSTEMS AND C-RAN SYSTEMS

(71) Applicant: Andrew Wireless Systems GmbH, Buchdorf (DE)

(72) Inventors: Florian Krieger, Wechingen (DE); Alfons Dussmann, Gansheim (DE); Daniel Schwab, Gersthofen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 17/022,406

(22) Filed: Sep. 16, 2020

(65) Prior Publication Data
US 2021/0099208 A1 Apr. 1, 2021

Related U.S. Application Data

(60) Provisional application No. 62/909,096, filed on Oct. 1, 2019.

(51) Int. Cl.
*H04B 7/06* (2006.01)
*H04B 17/318* (2015.01)
(Continued)

(52) U.S. Cl.
CPC ......... *H04B 7/0608* (2013.01); *H04B 7/0426* (2013.01); *H04B 17/318* (2015.01);
(Continued)

(58) Field of Classification Search
CPC .. H04B 7/0608; H04B 17/318; H04B 7/0426; H04B 7/024; H04W 48/16; H04W 72/0413; H04W 88/085; H04W 88/12
See application file for complete search history.

(56) References Cited

U.S. PATENT DOCUMENTS

2014/0105056 A1* 4/2014 Li ................... H04W 52/0206
370/252
2014/0233442 A1* 8/2014 Atias ................ H04W 52/0251
370/311
(Continued)

FOREIGN PATENT DOCUMENTS

EP 3057360 A1 8/2016

OTHER PUBLICATIONS

International Searching Authority, "International Search Report and Written Opinion from PCT Application No. PCT/EP2020/077421", from Foreign Counterpart to U.S. Appl. No. 17/022,406, filed Dec. 10, 2020, pp. 1 through 14, Published: WO.

*Primary Examiner* — Kenneth T Lam
(74) *Attorney, Agent, or Firm* — Fogg & Powers LLC

(57) ABSTRACT

In one example, a system includes a central unit and a plurality of radiating points communicatively coupled to the central unit and located remotely from the central unit. Each respective radiating point includes a detector configured to evaluate uplink signals received from a coverage area of the respective radiating point. The detector is further configured to determine which services of a plurality of services supported by the system are needed and which services of the plurality of services supported by the system are not needed based on the evaluation of the uplink signals. The detector is further configured to send a request, to the central unit, to activate a service determined to be needed.

20 Claims, 6 Drawing Sheets

(51) Int. Cl.
*H04B 7/0426* (2017.01)
*H04W 48/16* (2009.01)
*H04W 72/04* (2009.01)
*H04W 88/08* (2009.01)
*H04W 88/12* (2009.01)

(52) U.S. Cl.
CPC ....... *H04W 48/16* (2013.01); *H04W 72/0413* (2013.01); *H04W 88/085* (2013.01); *H04W 88/12* (2013.01)

(56) References Cited

U.S. PATENT DOCUMENTS

| | | | |
|---|---|---|---|
| 2016/0234773 A1* | 8/2016 | Choi | H04W 52/0206 |
| 2016/0262118 A1* | 9/2016 | Kim | H04W 52/365 |
| 2020/0178170 A1 | 6/2020 | Eisenwinter et al. | |

* cited by examiner

UPLINK CONTROLLED RESOURCE ALLOCATION FOR DISTRIBUTED ANTENNA SYSTEMS AND C-RAN SYSTEMS

CROSS-REFERENCE TO RELATED APPLICATIONS

This application claims the benefit of U.S. Provisional Application Ser. No. 62/909,096, filed Oct. 1, 2019, and titled "UPLINK CONTROLLED RESOURCE ALLOCATION FOR DISTRIBUTED ANTENNA SYSTEMS AND C-RAN SYSTEMS," which is hereby incorporated herein by reference.

BACKGROUND

A radio frequency distribution system (for example, a distributed antenna system (DAS) or a cloud radio access network (C-RAN) system) typically includes one or more central units (for example, master units, baseband controllers, or the like) communicatively coupled to one or more radiating points (for example, remote antenna units, radio points, access points, or the like) located remotely from the central unit(s). In recent years, DAS technology has progressed from analog implementations to digital implementations, which offer a number of advantages including increased flexibility, efficiency, and functionality. The difference between analog implementations and digital implementations is in the transport of signals between the master units and the remote antenna units of the DAS. In an analog DAS, the DAS traffic is distributed between the master units and the remote antenna units in analog form. In some DAS implementations, referred to as a hybrid DAS, DAS traffic is distributed between the master units and the remote units using a combination of digital and analog form. In a digital DAS, DAS traffic is distributed between the master units and the remote antenna units in digital form.

Typically, it is desirable for a DAS or C-RAN system to transport communication signals for all frequency bands used in a certain region or country (referred to as "frequency agnostic"), but this has proven difficult in recent years due to the large demand for data communications. In order to achieve a frequency agnostic digital DAS or C-RAN system, a large spectral bandwidth must be transported over the communication link (for example, optical link or Ethernet link) between the central units and the radiating points. In the past, digital transceivers were limited in bandwidth and it was not feasible to transport the spectrum of several operating bands via a single fiber. In more recent years, transceivers with rates up to 100 Gb/s (and above) have been developed, which make digital DAS and C-RAN system solutions more practical.

SUMMARY

In one example, a system includes a central unit and a plurality of radiating points communicatively coupled to the central unit and located remotely from the central unit. Each respective radiating point includes a detector configured to evaluate uplink signals received from a coverage area of the respective radiating point. The detector is further configured to determine which services of a plurality of services supported by the system are needed and which services of the plurality of services supported by the system are not needed based on the evaluation of the uplink signals. The detector is further configured to send a request, to the central unit, to activate a service determined to be needed.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
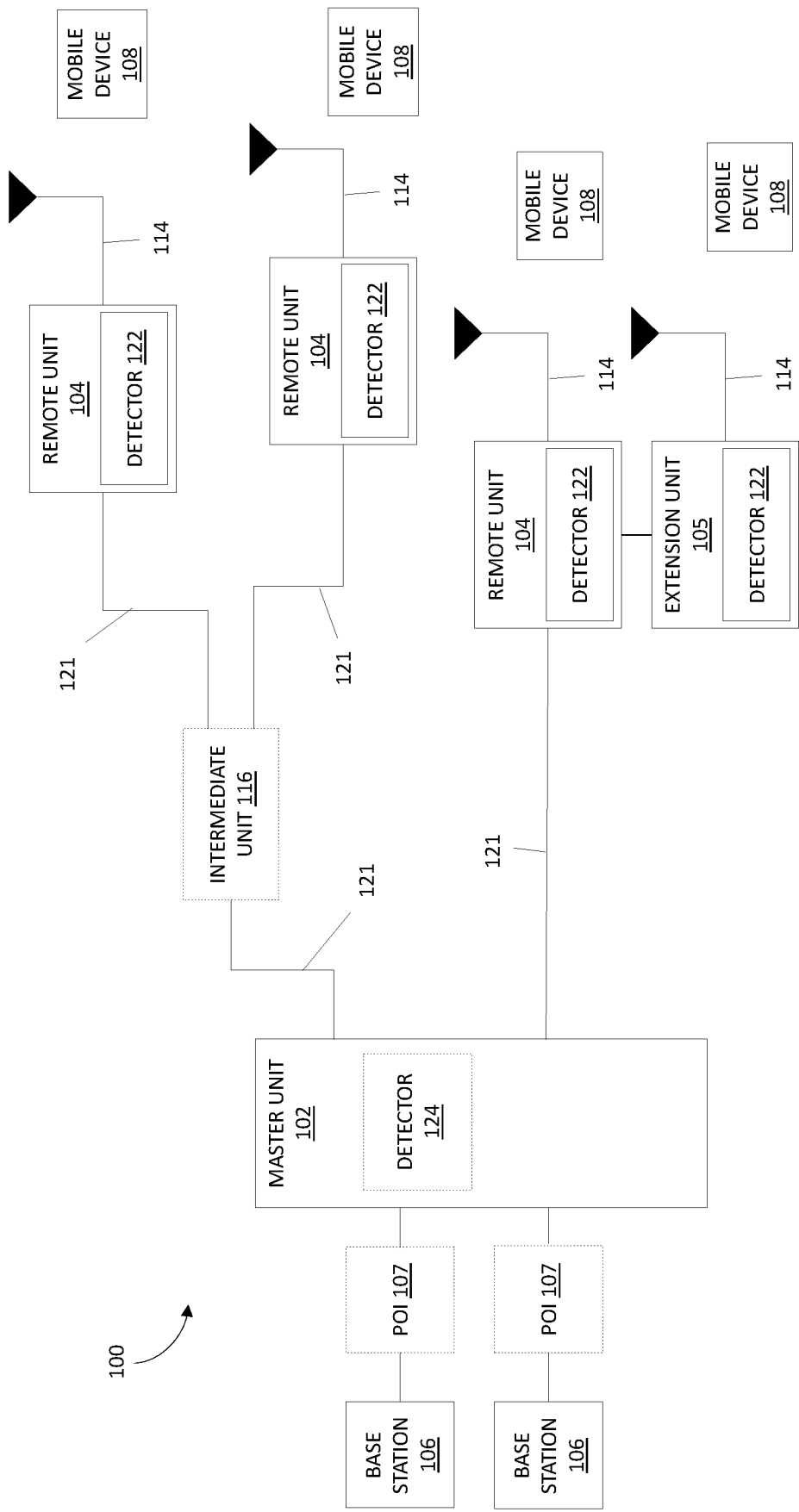
FIG. 1 is a block diagram of an example distributed antenna system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

As used herein, the term "service" corresponds to a single signal transmitted via the DAS or C-RAN system (for example, any WCDMA, CDMA2000, LTE, NR, or GSM carrier). Typically, the services supported by a DAS or C-RAN system are provided at all times, and the RF bandwidth supported by a digital transceiver (for example, optical or Ethernet) needs to be greater than or equal to the overall bandwidth of all services. For example, if the total bandwidth of the services supported by the DAS or C-RAN system is 700 MHz, then a digital transceiver must be capable of transporting 700 MHz RF spectrum in a Single Input Single Output (SISO) deployment or up to 1400 MHz in a full 2×2 Multiple-Input Multiple-Output (MIMO) deployment.

With the introduction of Citizens Broadband Radio Service (CBRS) and fifth generation (5G), even more frequency spectrum must be transported via the DAS or C-RAN system due to the new frequency bands made available to support the increasing demand on data rates. The new frequency bands for CBRS and 5G, 3.5 GHz and mmWave spectrum (24 GHz to 60 GHz) respectively, are at higher frequencies than previous cellular signals, and transmitting larger signal bandwidth at high frequencies comes with a cost since there is much higher penetration loss for the transmitted signals at higher frequencies compared to lower frequencies.

To address the increased demand on data rates and increased path loss at higher frequencies, one approach is to utilize the most sophisticated transceivers (for example, optical or Ethernet) having the highest rates and deploy more radiating points in the service area of the DAS or C-RAN system. While this approach would likely address both concerns regarding demand and path loss for a digital DAS or C-RAN system, the cost of such a system would be much higher than the cost of current DAS or C-RAN system solutions and likely be too high to be feasible.

The example systems and methods described herein address the above issues by taking advantage of the reality that not all frequency bands for the services supported by the system (for example, DAS or C-RAN system) are fully utilized at the same time. Some examples described herein include evaluating uplink signals at the radiating points of the system and only activating the services supported by the system that are needed at a given time in order to efficiently utilize the available bandwidth of a system for multiple services. In some examples, the uplink signals for services are evaluated using RSSI detection or digital signal decoding in the radiating point(s) to determine a number of mobile devices in the coverage area of the radiating points(s), the bandwidth utilization, or the power levels for the particular services.

It is likely that the mobile devices will not communicate uplink signals (for example, initiate a random access procedure) with a C-RAN system or with a base station via the DAS unless the mobile devices receives some downlink signals, so it may not be feasible to completely shut off downlink signals for services supported by the DAS or C-RAN system that are deactivated. In some examples, the central unit of the system is configured to allocate a portion of the downlink bandwidth for testing whether a particular inactive service supported by the system should be activated. In some examples, only the relevant information of the downlink signals that triggers an "initial access" procedure of the mobile devices in the coverage area is sent in test downlink signals.

Using the techniques described herein, less expensive transceivers can be used due to the efficient bandwidth utilization for the transport from the central unit to the radiating points. Further, the overall cost of operating a DAS or C-RAN system can be reduced by deactivating services that are not needed at a given time, even considering a larger number of radiating points.

DAS Implementation

FIG. 1 is a block diagram of an example distributed antenna system (DAS) 100. In the example of FIG. 1, the DAS 100 includes a master unit 102 communicatively coupled to one or more base stations 106 and one or more remote antenna units 104. While a single master unit 102 communicatively coupled to two base stations 106 and four remote antenna units 104, 105 in the DAS 100 is shown in FIG. 1, it should be understood that this is for ease of illustration and the DAS 100 can include any number of master units 102 and remote antenna units 104, 105 depending on the desired coverage and capacity for the DAS 100. Further, the master unit 102 can be communicatively coupled to any number of base stations 106.

In the example of FIG. 1, the DAS 100 includes one or more master units 102 (also referred to as "host units" or "central area nodes" or "central units") and one or more remote antenna units 104 (also referred to as "remote units" or "access points") that are communicatively coupled to the one or more master units 102. In this example, the DAS 100 comprises a digital DAS, in which DAS traffic is distributed between the master units 102 and the remote antenna units 104 in digital form. In other examples, the DAS 100 comprises an analog DAS, in which DAS traffic is distributed between the master units 102 and the remote antenna units 104 in analog form. In other examples, the DAS 100 comprises a hybrid DAS, in which DAS traffic is distributed between the master units and the remote units using a combination of digital and analog form. The DAS 100 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 102 is communicatively coupled to the plurality of base stations 106. One or more of the base stations 106 can be co-located with the respective master unit 102 to which it is coupled (for example, where the base station 106 is dedicated to providing base station capacity to the DAS 100). Also, one or more of the base stations 106 can be located remotely from the respective master unit 102 to which it is coupled (for example, where the base station 106 is a macro base station providing base station capacity to a macro cell in addition to providing capacity to the DAS 100). In this latter case, a master unit 102 can be coupled to a donor antenna using an over-the-air repeater in order to wirelessly communicate with the remotely located base station.

The base stations 106 can be implemented in a traditional manner in which a base band unit (BBU) is deployed at the same location with a radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (ORAN) families of specifications). Also, the base stations 106 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 106 can be implemented as a small cell base station in which the BBU and RRH functions are deployed together in a single package.

The master unit 102 can be configured to use wideband interfaces or narrowband interfaces to the base stations 106. Also, the master unit 102 can be configured to interface with the base stations 106 using analog radio frequency (RF) interfaces or digital interfaces (for example, using a CPRI, OBSAI, or ORAN digital IQ interface). In some examples, the master unit 102 interfaces with the base stations 106 via one or more wireless interface nodes (not shown). A wireless interface node can be located, for example, at a base station hotel, and group a particular part of a RF installation to transfer to the master unit 102.

Traditionally, a master unit 102 interfaces with one or more base stations 106 using the analog radio frequency signals that each base station 106 communicates to and from a mobile device 108 (also referred to as "mobile units" or "user equipment") of a user using a suitable air interface standard. Although the devices 108 are referred to here as "mobile" devices 108, it is to be understood that the devices 108 need not be mobile in ordinary use (for example, where the device 108 is integrated into, or is coupled to, a sensor unit that is deployed in a fixed location and that periodically wirelessly communicates with a gateway or other device).

The DAS 100 operates as a distributed repeater for such radio frequency signals. RF signals transmitted from each base station 106 (also referred to herein as "downlink RF signals") are received at the master unit. In such examples, the master unit 102 uses the downlink RF signals to generate a downlink transport signal that is distributed to one or more of the remote antenna units 104. Each such remote antenna unit 104 receives the downlink transport signal and reconstructs a version of the downlink RF signals based on the downlink transport signal and causes the reconstructed downlink RF signals to be radiated from an antenna 114 coupled to or included in that remote antenna unit 104.

In some aspects, the master unit 102 is directly coupled to the remote antenna units 104. In such aspects, the master unit 102 is coupled to the remote antenna units 104 using cables 121. For example, the cables 121 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 108 (also referred to herein as "uplink RF signals") are received at one or more remote antenna units 104 via an antenna 114. Each remote antenna unit 104 uses the uplink RF signals to generate an uplink transport signal that is transmitted from the remote antenna unit 104 to a master unit 102. The master unit 102 receives uplink transport signals transmitted from one or more remote antenna units 104 coupled to it. The master unit 102 can combine data or signals communicated via the uplink transport signals from multiple remote antenna units 104 (for example, where the DAS 100 is implemented as a digital DAS 100, by digitally summing corresponding digital samples received from the various remote antenna units 104) and generates uplink RF signals from the combined data or signals. In such examples, the master unit 102 communicates the generated uplink RF signals to one or more base stations 106. In this way, the coverage of the base stations 106 can be expanded using the DAS 100.

As noted above, in the example shown in FIG. 1, the DAS 100 is implemented as a digital DAS. In a "digital" DAS, signals received from and provided to the base stations 106 and mobile devices 108 are used to produce digital in-phase (I) and quadrature (Q) samples, which are communicated between the master unit 102 and remote antenna units 104. It is important to note that this digital IQ representation of the original signals received from the base stations 106 and from the mobile units still maintains the original modulation (that is, the change in the amplitude, phase, or frequency of a carrier) used to convey telephony or data information pursuant to the cellular air interface protocol used for wirelessly communicating between the base stations 106 and the mobile units. Examples of such cellular air interface protocols include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface protocols. Also, each stream of digital IQ samples represents or includes a portion of wireless spectrum. For example, the digital IQ samples can represent a single radio access network carrier (for example, a 5G NR carrier of 40 MHz or 400 MHz) onto which voice or data information has been modulated using a 5G NR air interface. However, it is to be understood that each such stream can also represent multiple carriers (for example, in a band of frequency spectrum or a sub-band of a given band of frequency spectrum).

In the example shown in FIG. 1, the master unit 102 can be configured to interface with one or more base stations 106 using an analog RF interface (for example, via the analog RF interface of an RRH or a small cell base station). In some examples, the base stations 106 can be coupled to the master unit 102 using a network of attenuators, combiners, splitters, amplifiers, filters, cross-connects, etc., which is referred to collectively as a point-of-interface (POI) 107. This is done so that, in the downlink, the desired set of RF carriers output by the base stations 106 can be extracted, combined, and routed to the appropriate master unit 102, and so that, in the uplink, the desired set of carriers output by the master unit 102 can be extracted, combined, and routed to the appropriate interface of each base station 106. In other examples, the POI 107 can be part of the master unit 102.

In the example shown in FIG. 1, in the downlink, the master unit 102 can produce digital IQ samples from an analog signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of radio frequency spectrum output by one or more base stations 106. Each portion of radio frequency spectrum can include, for example, a band of wireless spectrum, a sub-band of a given band of wireless spectrum, or an individual wireless carrier.

Likewise, in the uplink, the master unit 102 can produce an uplink analog signal from one or more streams of digital IQ samples received from one or more remote antenna units 104 by digitally combining streams of digital IQ samples that represent the same carriers or frequency bands or sub-bands received from multiple remote antenna units 104 (for example, by digitally summing corresponding digital IQ samples from the various remote antenna units 104), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the example shown in FIG. 1, the master unit 102 can be configured to interface with one or more base stations 106 using a digital interface (in addition to, or instead of) interfacing with one or more base stations 106 via an analog RF interface. For example, the master unit 102 can be configured to interact directly with one or more BBUs using the digital IQ interface that is used for communicating between the BBUs and an RRHs (for example, using the CPRI serial digital IQ interface).

In the downlink, the master unit 102 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 104 used in the DAS 100. In the uplink, the master unit 102 receives uplink streams of digital IQ samples from one or more remote antenna units 104, digitally combining streams of digital IQ samples that represent the same carriers or frequency bands or sub-bands received from multiple remote antenna units 104 (for example, by digitally summing corresponding digital IQ samples received from the various remote antenna units 104), and, if necessary, converts (by re-sampling, synchronizing, combining, separating, gain adjusting, etc.) them into uplink streams of digital IQ samples compatible with the one or more BBUs that are coupled to that master unit 102.

In the downlink, each remote antenna unit 104 receives streams of digital IQ samples from the master unit 102, where each stream of digital IQ samples represents a portion of wireless radio frequency spectrum output by one or more base stations 106. Each remote antenna unit 104 generates, from the downlink digital IQ samples, one or more downlink RF signals for radiation from the one or more antennas coupled to that remote antenna unit 104 for reception by any mobile devices 108 in the associated coverage area. In the uplink, each remote antenna unit 104 receives one or more uplink radio frequency signals transmitted from any mobile devices 108 in the associated coverage area, generates one or more uplink streams of digital IQ samples derived from the received one or more uplink radio frequency signals, and transmits them to the master unit 102.

Each remote antenna unit 104 can be communicatively coupled directly to one or more master units 102 or indirectly via one or more other remote antenna units 104 and/or via one or more intermediate units 116 (also referred to as "expansion units" or "transport expansion nodes"). The latter approach can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104. The expansion units are coupled to the master unit 102 via one or more cables 121.

In the example DAS 100 shown in FIG. 1, a remote antenna unit 104 is shown having another co-located remote antenna unit 105 (also referred to herein as an "extension unit") communicatively coupled to it. Subtending a co-located extension remote antenna unit 105 from another remote antenna unit 104 can be done in order to expand the number of frequency bands that are radiated from that same location and/or to support MIMO service (for example, where different co-located remote antenna units radiate and receive different MIMO streams for a single MIMO frequency band). The remote antenna unit 104 is communicatively coupled to the "extension" remote antenna units 105 using a fiber optic cable, a multi-conductor cable, coaxial cable, or the like. In such an implementation, the remote antenna units 105 are coupled to the master unit 102 of the DAS 100 via the remote antenna unit 104.

In the example shown in FIG. 1, the DAS 100 further includes detectors 122 in the remote antenna units 104 coupled to the uplink and/or downlink communication path and configured to measure signals from the uplink and/or downlink communication path. In some examples, the detectors 122 are configured to determine a power level, bandwidth utilization, or a number of mobile devices 108 in the coverage area of the respective remote antenna unit 104 for each service supported by the DAS 100. In some examples, the detectors 122 are a Received Signal Strength Indicator (RSSI) detector configured to measure the signal strength of uplink signals from mobile devices 108 in the coverage area of the respective remote antenna unit 104 or the signal strength of downlink signals from the master unit 102 to be transmitted to the mobile devices 108. It should be understood that different types of detectors 122 can be used for different remote antenna units 104.

In some examples, the DAS 100 further includes one or more detectors 124 in the master unit 102 coupled to the uplink and/or downlink communication path and configured to measure signals from the uplink and/or downlink communication path. In some examples, the one or more detectors 124 are configured to determine a power level, bandwidth utilization, or a number of mobile devices 108 in coverage areas of the DAS 100 for each service supported by the DAS 100. In some examples, the one or more detectors 124 are an RSSI detector configured to measure the signal strength of uplink signals from remote antenna units 104 or the signal strength of downlink signals from the base station 106 to be transmitted to the remote antenna units 104.

In some examples, the DAS 100 can be configured to compare the power levels measured at an RSSI detector coupled to the uplink signal path of the master unit 102 and the power levels measured at RSSI detectors coupled to the uplink signal path of the remote antenna units 104. In some examples, the DAS 100 is configured to adjust the gain of the uplink signal path in the master unit 102 and/or the uplink signal path of the remote antenna units 104 based on the determinations made by the detectors 122 and/or detector(s) 124. In some examples, the DAS 100 is configured to reduce the gain of the uplink signal path when the power levels measured at the detector(s) 124 included in the master unit 102 indicate that the power level for one or more services supported by the DAS 100 exceeds an acceptable level for the base station 106. In such examples, the gain of the uplink signal path can be adjusted in the master unit 102, the intermediate unit 116, and/or the remote antenna units 104.

Figure 2A:
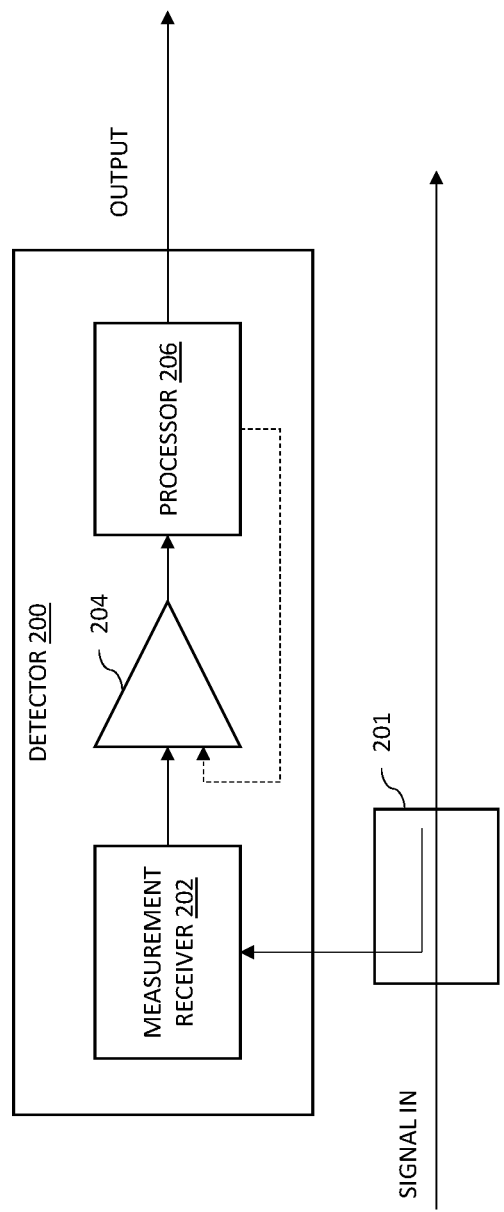
FIGS. 2A-2B are block diagrams of example detectors.

An example of a detector 122, 124, which measures the power level of signals in the time domain, is shown in FIG. 2A. In the example shown in FIG. 2A, the detector 200 includes a measurement receiver 202, a comparator 204, and a processor 206. In some examples, the detector 200 is used where the DAS 100 is implemented as an analog DAS. It should be understood that the detector 200 can be coupled to the uplink signal path and/or the downlink signal path and at different positions in the communication paths (for example, in the master unit 102, remote antenna units 104, or intermediate unit 116). Further, the detector 200 can also be configured to detect signals at any point in the uplink signal path or the downlink signal path where it is desirable to make such measurements. For example, the detector 200 can be configured to detect signals before combining, after combining, before automatic gain control, after automatic gain control, etc.

The measurement receiver 202 is configured to receive signals from the communication path via a coupler 201. The measurement receiver 202 is configured to convert the received signals to voltage signals and the level of the voltage signals depends on the power level of the received signals. The measurement receiver 202 outputs the voltage signals to the comparator 204.

The comparator 204 is configured to convert the voltage signals received from the measurement receiver 202 to digital signals. In particular, the comparator 204 is configured to compare the level of the voltage signals for a particular time period to a threshold power level and outputs a high signal or a low signal based on the comparison. In some examples, the output of the comparator 204 is indicative of whether the corresponding received uplink signal for the particular time period is in an idle state or a utilized state. For example, the comparator 204 is configured to output a high signal (indicative of an active state) when the level of the voltage signal during the particular time period is greater than the threshold power level and output a low signal (indicated of an idle state) when the level of the voltage signal during the particular time period is less than the threshold power level. In some examples, the time period corresponds to a length of a symbol or a length of a time slot for an air interface protocol (such as, for example, Long-Term Evolution (LTE), Citizens Broadband Radio Service (CBRS), fifth generation New Radio (5G NR) air interface protocols).

In some examples, the threshold power level is fixed and determined during production with a calibration process. In some examples, the threshold power level is modified during installation or operation depending on the characteristics of the environment near the detector 200. In such examples, the threshold power level can be adjusted automatically using the processor 206 or manually by an installer or user via a management interface. In examples where the detector 200 is used to measure downlink signals, the initial calibration is most likely sufficient since the difference between the power level of a utilized state and an idle state is quite large. In examples where the detector 200 is used to measure uplink signals, the threshold power level may need to be adjusted depending on the RF environment near the detector 200.

The processor 206 is configured to measure the high signals and low signals output by the comparator 204. In some examples, the processor 206 is configured to estimate the utilization of the bandwidth allocated for each service supported by the DAS 100 and/or the number of mobile devices for each service supported by the DAS 100. In some examples, the processor 206 is configured to estimate the bandwidth utilization for each service supported by the DAS 100 based on the output of the comparator 204. In some examples, the processor 206 is configured to estimate the bandwidth utilization for a service supported by the DAS 100 in a percentage with the following formula:

$$T_{in\%}=100*(T_{sym}-T_0)/(T_{100}-T_0)$$

When no device is connected to the system, only the management signals will be measured, which results in a time $T_0$ for the output of the comparator 204 being a high signal over a time period corresponding to a frame. The value $T_0$ can be determined during start-up for the system, for example. When devices are connected, and the network bandwidth utilization is one hundred percent, the comparator output is high for a maximum amount of time and results in a measured time $T_{100}$, which can be known (or determined) ahead of time. In examples where LTE signals are measured, the time $T_{100}$ corresponds to the frame length for LTE (10 milliseconds). The measured symbol time $T_{sym}$ corresponds to the amount of time the output of the comparator 204 is high during the measurement period (for example, the frame length) and will have a range of $T_0$ to $T_{100}$.

The accuracy of the estimates made using the above techniques can, and should, be evaluated during installation or initialization of the DAS 100. If the accuracy is not sufficient to reliably estimate the bandwidth utilization or number of mobile devices, the above techniques could alternatively be used to determine whether a signal is present for each service supported by the DAS 100. In such examples, the processor 206 is configured to compare the estimated bandwidth utilization (Tin %) to a threshold, which can be set or selected by the network operator or adjusted by the processor 206 during operation, if desired. In such examples, if the estimated bandwidth utilization exceeds the threshold, then it can be determined that a signal is present.

Figure 2B:
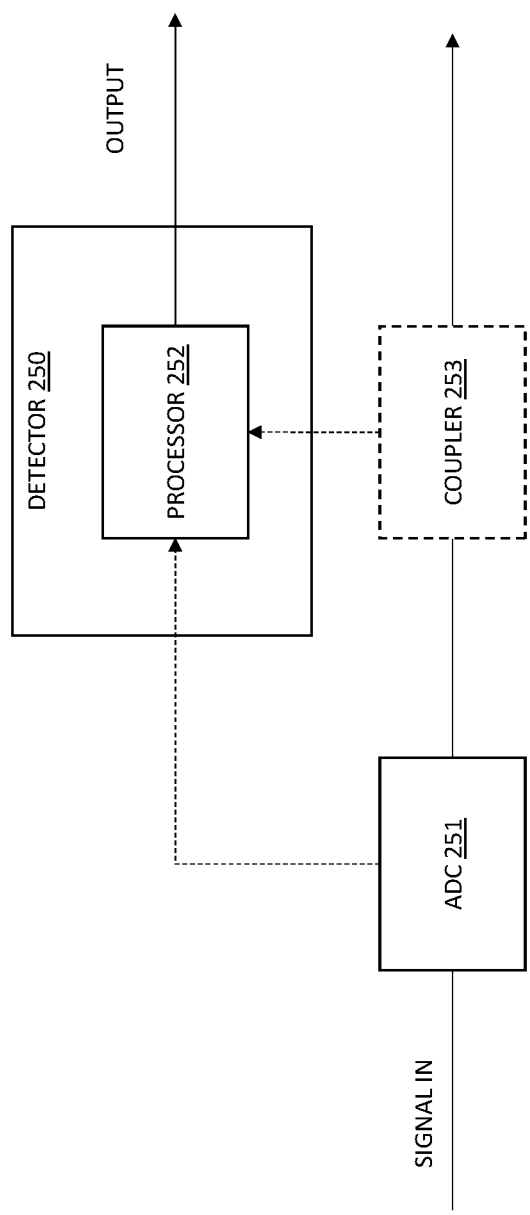

Another example of a detector 122, 124 is shown in FIG. 2B. In the example shown in FIG. 2B, the detector 250 includes a processor 252 communicatively coupled to an analog-to-digital converter (ADC) 251. In the example shown in FIG. 2B, the processor 252 of the detector 250 is configured to receive digital signals from an analog-to-digital converter 252. In some examples, the detector 250 is used where the DAS 100 is implemented as a digital DAS. It should be understood that the detector 250 can be coupled to the uplink signal path and/or the downlink signal path and at different positions in the communication paths (for example, in the master unit 102, remote antenna units 104, or intermediate unit 116). Further, the detector 250 can also be configured to detect signals at any point in the uplink signal path or the downlink signal path where it is desirable to make such measurements. For example, the detector 250 can be configured to detect signals before combining, after combining, before automatic gain control, after automatic gain control, etc. In examples where the detector 250 is configured to detect signals at points in a communication path away from the ADC 251, then the detector 250 can be configured to receive digital signals from a coupler 253 in the communication path.

In some examples, the processor 252 is configured to determine a power level of the digital signals and compare the power level of the digital signals with a threshold power level. Similar to the detector 200 described above, the threshold power level can be fixed or adjustable, and the threshold power level can be set such that a power level that exceeds the threshold is indicative of a utilized state and a power level below the threshold power level is indicative of an idle state. In some examples, the processor 252 is configured to estimate the utilization of the bandwidth allocated for each service supported by the DAS 100 and/or the number of mobile devices for each service supported by the DAS 100 in a similar manner to that described above with respect to detector 200.

In some examples, the detectors 200, 250 can also be used to detect noise or interference if the symbol length is known for the services provided by the DAS 100. In examples where LTE signals are measured, if the voltage signal is above the threshold power level for less time than the length of a symbol (~71 µs), then the processor 206 can determine that this high signal represents noise or interference signals rather than a desired signal. Similar noise detection could be used for other communication protocols as well where there is a fixed, known symbol length.

In some other examples, the detector 122 in the remote antenna units 104 is configured to decode the received signals rather than use RSSI detection. In such examples, the detector 122 is further configured to compare the decoded signals to known signals to determine the number of mobile devices or the bandwidth utilization for each service supported by the DAS 100. For example, the reference signals to be used for the comparison are known and standardized by 3GPP, so the decoded signals can be cross-correlated with the reference signals to determine the number of mobile devices and/or bandwidth utilization for the service supported by the DAS 100.

In some examples, the bandwidth needed to transport signals between the master unit 102 and remote antenna units 104 for all services supported by the DAS 100 exceeds the capabilities of the transceiver (for example, lower data rate optical transceiver) in the master unit 102. In such examples, the DAS 100 is configured with a prioritization scheme such that the bandwidth for the highest priority service is transported and the remaining transport bandwidth is filled with the next highest priority service(s) until the transport bandwidth is utilized. In some examples, the prioritization scheme is based on the measurements by the detectors 122. For example, the services with the highest number of mobile devices 108, highest bandwidth utilization, and/or highest power levels can be given highest priority for transport.

In some examples, the components of the DAS 100 can be configured to activate services supported by the DAS 100 as needed based on the measurements by the detectors 122. By deactivating services that are not needed, the DAS 100 provides greater flexibility in how the transport bandwidth can be used. In some examples, the transport bandwidth that is gained from deactivating an inactive service can be used for another service at the given instant of time (for example, using a prioritization scheme). In other examples, the transport bandwidth that is gained from deactivating an inactive service can be left empty if the required transport bandwidth is less than the maximum transport bandwidth supported by the optical transceiver in the master unit 102.

C-RAN Implementation

Figure 3:
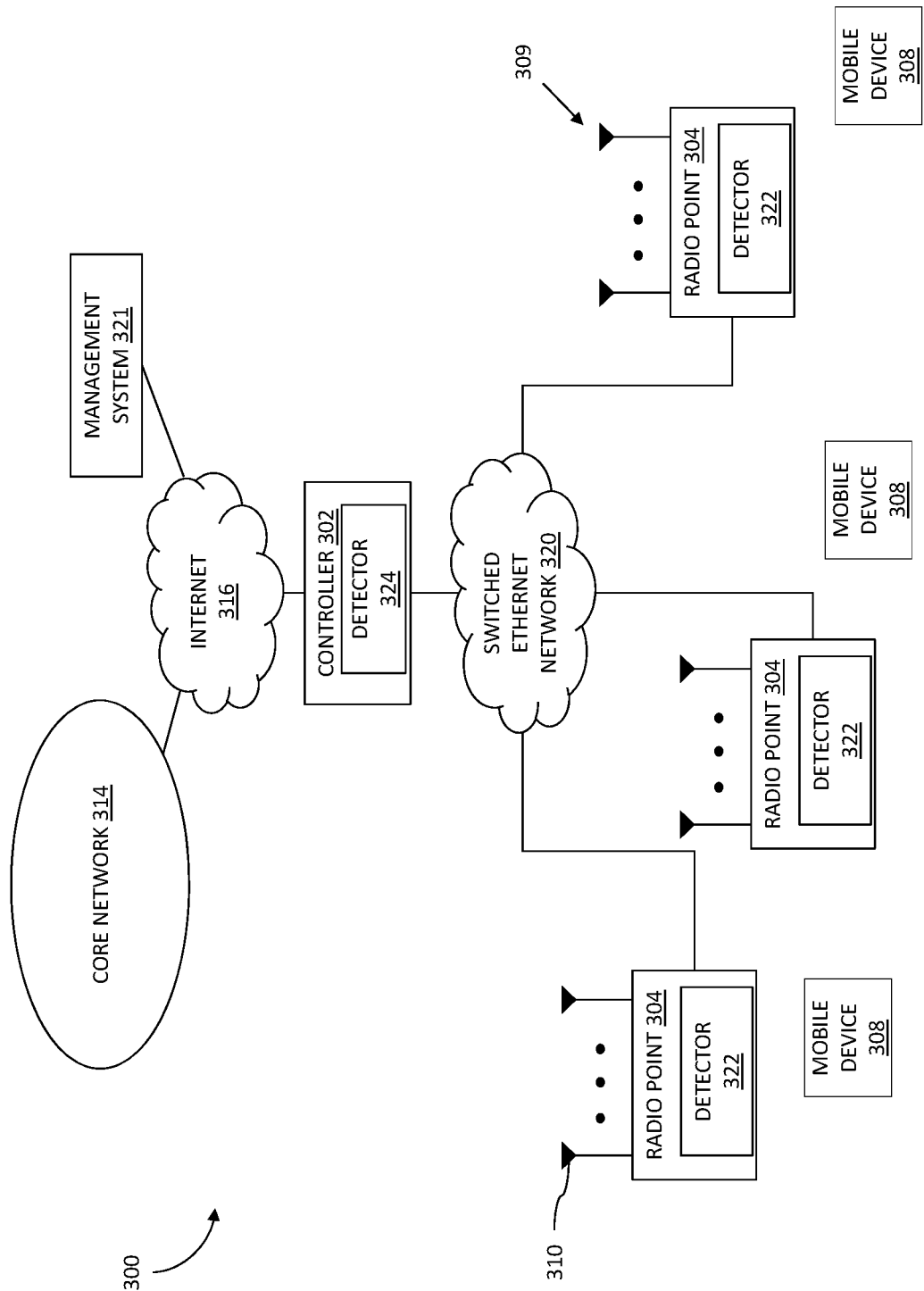
FIG. 3 is a block diagram of an example C-RAN system.

FIG. 3 is a block diagram illustrating one example of a radio access network (RAN) system 300 that can be enhanced with the detection techniques described herein. The system 300 is deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the example shown in FIG. 3, the system 300 is implemented at least in part using a C-RAN architecture that employs at least one baseband unit 302 and multiple radio points 304. The system 300 is also referred to herein as a "C-RAN system" 300. Each radio point 304 is remotely located from the baseband unit 302. Also, in this example, at least one of the radio points 304 is remotely located from at least one other radio point 304. The baseband units 302 are also referred to herein as "baseband controllers" 302 or just "controllers" 302.

Each radio point 304 includes or is coupled to an antenna array 309 comprising multiple antennas 310 via which downlink RF signals are radiated to user equipment (UE) and via which uplink RF signals transmitted by UEs are received. Various numbers of antennas 310 can be used (for example, thirty-two antennas 310). The radio points 304 are also referred to as "radiating points" or "access points."

The system 300 is coupled to the core network 314 of each wireless network operator over an appropriate back-haul. In the example shown in FIG. 3, the Internet 316 is used for back-haul between the system 300 and each core network 314. However, it is to be understood that the back-haul can be implemented in other ways.

The example of the system 300 shown in FIG. 3 is suitable for any air interface (including, for example and without limitation, Long Term Evolution (LTE) and the Fifth Generation (5G) air interfaces).

In some examples, the controller 302 and radio points 304 together are used to implement an Evolved Node B (also referred to herein as an "eNodeB" or "eNB") that is used to provide user equipment with mobile access to the wireless network operator's core network 314 to enable the user equipment to wirelessly communicate data and voice. This eNodeB can be a macro eNodeB or a home eNodeB (HeNB). In other examples, the controller 302 and radio points 304 together are used to implement a Next Generation Node B (also referred to as a "gNodeB" or "gNB") that is used to provide user equipment with mobile access to the wireless network operator's core network 314 to enable the user equipment to wirelessly communicate data and voice.

The controllers 302 and the radio points 304 can be implemented so as to use an air interface that supports one or more of frequency-division duplexing (FDD) and/or time-division duplexing (TDD). Moreover, the controllers 302 and/or the radio points 304 can be configured to support multiple air interfaces and/or to support multiple wireless operators.

Each controller 302 is communicatively coupled to the radio points 304 using a front-haul network. In the example shown in FIG. 3, the front-haul that communicatively couples each controller 302 to one or more radio points 304 is implemented using a standard switched Ethernet network 320. However, it is to be understood that the front-haul between the controllers 302 and radio points 304 can be implemented in other ways.

The switched Ethernet network 320 comprises one or more Ethernet switches. Each controller 302 is communicatively coupled to one or more of the switches in the Ethernet network 320 via a respective one or more Ethernet links (only one of which is shown for ease of illustration). Each radio point 304 is communicatively coupled to one or more of the switches in the Ethernet network 320 via a respective one or more Ethernet links (only one of which is shown for ease of illustration).

Generally, one or more nodes in a C-RAN system perform analog radio frequency (RF) functions for the air interface as well as digital Layer 1, Layer 2, and Layer 3 (of the Open Systems Interconnection (OSI) model) functions for the air interface.

In the example shown in FIG. 3, each baseband controller 302 comprises Layer-1 (L1) functionality, Layer-2 (L2) functionality, and Layer-3 (L3) functionality configured to perform at least some of the Layer-1 processing, Layer-2 processing, and Layer-3 processing, respectively, for the air interface implemented by the C-RAN system 300. Each radio point 304 includes Layer-1 functionality that implements any Layer-1 processing for the air interface that is not performed in the controllers 302 and one or more radio frequency (RF) circuits (not shown) that implement the RF front-end functions for the air interface and the one or more antennas 310 associated with that radio point 304.

Different splits in the air-interface processing between the controller 302 and the radio points 304 can be used. In one example, each baseband controller 302 can be configured to perform all of the digital Layer-1, Layer-2, and Layer-3 processing for the air interface, while the radio points 304 (specifically, the RF circuits) implement only the RF functions for the air interface and the antennas 309 associated with each radio point 304. In that case, in-phase and quadrature (IQ) data representing time-domain symbols for each antenna is communicated between the controller 302 and the radio points 304. Other splits can be used and data can be communicated between the controllers 302 and the radio points 304 in other formats. In the following description, the front-haul data communicated between the controllers 302 and the radio points 304 for the air interface is generally referred to as "IQ data" even though such front-haul data can take many forms, including forms that are not IQ data.

Also, the form in which IQ data is communicated in the downlink direction (that is, the direction from the controller 302 to the radio points 304) can differ from the form in which IQ data is communicated in the uplink direction (that is, the direction from the radio points 304 to the controller 302). Also, for a given direction (downlink or uplink), not all front-haul data needs to be communicated in the same form (that is, the front-haul data for different channels or for different resource blocks can be communicated in different ways).

Data can be front-hauled between the controllers 302 and radio points 304 in other ways.

Each controller 302 and radio point 304 (and the functionality described as being included therein), as well as the C-RAN system 300 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 302 and radio point 304, and the C-RAN system 300 more generally, can be implemented in other ways.

In the example shown in FIG. 3, a management system 321 is communicatively coupled to the controllers 302 and radio points 304, for example, via the Internet 316 and Ethernet network 320 (in the case of the radio points 304).

In the example shown in FIG. 3, the management system 321 communicates with the various elements of the system 300 using the Internet 316 and the Ethernet network 320. Also, in some implementations, the management system 321 sends and receives management communications to and from the controllers 302, each of which in turn forwards relevant management communications to and from the radio points 304. The management system 321 can comprise a proprietary management system provided by the vendor of the C-RAN system 300, a Home eNodeB management system (HeNB MS) (or other eNodeB management system) used by an operator to manage Home eNodeBs (or other eNodeBs) deployed in its network.

Each controller 302 can also implement a management interface by which a user is able to directly interact with the controller 302. This management interface can be implemented in various ways including, for example, by implementing a web server that serves web pages that implement a web-based graphical user interface for a user to interact with the controller 302 using a web browser and/or by implementing a command-line interface by which a user is able to interact with the controller 302, for example, using secure shell (SSH) software.

In the example shown in FIG. 3, the C-RAN system 300 further includes detectors 322 in the radio points 304 coupled to the uplink and/or downlink communication path and configured to measure signals from the uplink and/or downlink communication path. In some examples, the detectors 322 are configured to determine a power level, bandwidth utilization, or a number of mobile devices 308 in the coverage area of the respective radio points 304 for each service supported by the DAS 100. In some examples, the detectors 322 are a Received Signal Strength Indicator (RSSI) detector configured to measure the signal strength of uplink signals from mobile devices 308 in the coverage area of the respective radio point 304 or the signal strength of downlink signals from the controller 302 to be transmitted to the mobile devices 308. It should be understood that different types of detectors 322 can be used for different radio points 304.

In some examples, the C-RAN system 300 further includes one or more detectors 324 in the controller 302 coupled to the uplink and/or downlink communication path and configured to measure signals from the uplink and/or downlink communication path. In some examples, the one or more detectors 324 are configured to determine a power level, bandwidth utilization, or a number of mobile devices 308 in coverage areas of the C-RAN system 300 for each service supported by the C-RAN system 300. In some examples, the one or more detectors 324 are an RSSI detector configured to measure the signal strength of uplink signals from radio points 304 or the signal strength of downlink signals to be transmitted to the radio points 304.

In some examples, the C-RAN system 300 can be configured to compare the power levels measured at an RSSI detector coupled to the uplink signal path of the controller 302 and the power levels measured at RSSI detectors coupled to the uplink signal path of the radio points 304. In some examples, the C-RAN system 300 is configured to adjust the gain of the uplink signal path in the controller 302 and/or the uplink signal path of the radio points 304 based on the determinations made by the detectors 322 and/or detector(s) 324. In some examples, the C-RAN system 300 is configured to reduce the gain of the uplink signal path when the power levels measured at the detector(s) 322 included in the radio points 304 indicate that the power level for one or more services supported by the C-RAN system 300 exceeds an acceptable level. In such examples, the gain of the uplink signal path can be adjusted in the radio points 304.

Similar to the detectors 122, 124 described above with respect to FIG. 1, the detectors 322, 324 can be implemented as detectors 200, 250 as described above with respect to FIGS. 2A-2B.

In some other examples, the detector 322 in the radio points 304 is configured to decode the received signals rather than use RSSI detection. In such examples, the detector 322 is further configured to compare the decoded signals to known signals to determine the number of mobile devices or the bandwidth utilization for each service supported by the C-RAN system 300. For example, the reference signals to be used for the comparison are known and standardized by 3GPP, so the decoded signals can be cross-correlated with the reference signals to determine the number of mobile devices and/or bandwidth utilization for the service supported by the C-RAN system 300.

In some examples, the bandwidth needed to transport signals between the controller 302 and radio points 304 for all services supported by the C-RAN system 300 exceeds the capabilities of the transceiver (for example, lower data rate transceiver) in the controller 302. In such examples, the C-RAN system 300 is configured with a prioritization scheme such that the bandwidth for the highest priority service is transported and the remaining transport bandwidth is filled with the next highest priority service(s) until the transport bandwidth is utilized. In some examples, the prioritization scheme is based on the measurements by the detectors 322. For example, the services with the highest number of mobile devices 308, highest bandwidth utilization, and/or highest power levels can be given highest priority for transport.

In some examples, the components of the C-RAN system 300 can be configured to activate services supported by the C-RAN system 300 as needed based on the measurements by the detectors 322. By deactivating services that are not needed, the C-RAN system 300 provides greater flexibility in how the transport bandwidth can be used. In some examples, the transport bandwidth that is gained from deactivating an inactive service can be used for another service at the given instant of time (for example, using a prioritization scheme). In other examples, the transport bandwidth that is gained from deactivating an inactive service can be left empty if the required transport bandwidth is less than the maximum transport bandwidth supported by the transceiver in the controller 302.

Figure 4:
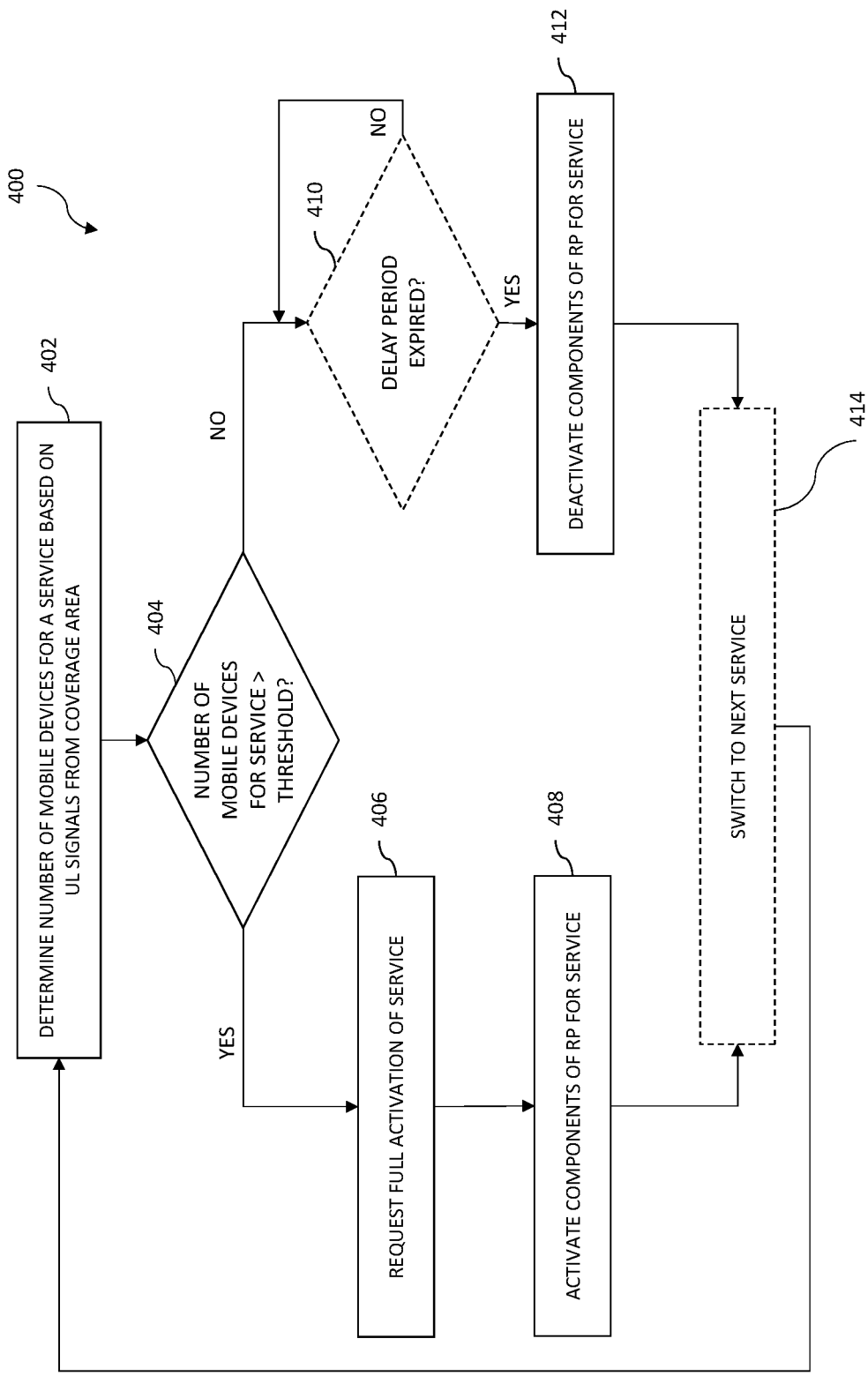
FIG. 4 is a flow diagram of an example method for determining whether to activate services at a remote antenna unit of a distributed antenna system.

FIG. 4 is a flow diagram of an example method 400 for determining whether to activate services at a radiating point of a system. The common features discussed above with respect to DAS 100 and C-RAN system 300 in FIGS. 1-3 can include similar characteristics to those discussed with respect to method 400 and vice versa. In some examples, method 400 can be performed by respective detectors (for example, detectors 122 or detectors 200, 250) in remote antenna units of a DAS or radio points of a C-RAN system.

Method 400 includes determining the number of mobile devices for a particular service in a coverage area of a radiating point based on uplink signals received from the coverage area (block 402). In some examples, the number of mobile devices is determined using an RSSI detector in the radiating point and a known relationship between RSSI and the number of mobile devices. In some examples, the number of mobile devices can be estimated by a detector that operate in a similar manner to detectors 200, 250 described above with respect to FIGS. 2A-2B. In other examples, the number of mobile devices is determined by a detector in the radiating point that decodes the uplink signals from the mobile devices and implements a mobile device counting variable.

Method 400 further includes determining whether the number of mobile devices for the particular service in the coverage area of the radiating point is greater than a threshold (block 404). In some examples, the detector in the radiating point compares the determined number of mobile devices for a service in the coverage area to a threshold value. In some examples, the threshold is set by the owner of the system or the network operator. The threshold can be set based on coverage and capacity requirements for particular numbers of mobile devices, for example. In some examples, the threshold is set such that more than one mobile device for a service is required to be in the coverage area and provide uplink signals for the threshold to be exceeded. In some examples, the threshold is adjustable during operation of the system. In other examples, the threshold is fixed after it is set during initial calibration.

When the number of mobile devices for a service in the coverage area of the radiating point is greater than the threshold, the method 400 proceeds with requesting full activation of the service (block 406). In some examples, the request to fully activate the service is sent from the radiating point to the central unit of the system.

Method 400 includes activating components of the radiating point for a service being fully activated (block 408). For example, one or more RF power amplifiers of the radiating point, fans, or other components of the radiating point can be activated when a service is fully activated. In some examples, the number of power amplifiers that are activated can be determined based on the number of services in the coverage area of the radiating point. In some examples, the radiating point is configured to activate the components in response to an instruction provided by the central unit.

When the number of mobile devices in the coverage area of the radiating point is less than the threshold, method 400 optionally includes determining whether a delay period has expired (block 410). In some examples, the delay period is essentially the amount of time for testing a particular service and this period can be determined by the owner/operator of the system. In some examples, the delay period is on the order of seconds to minutes. It can be advantageous to include the delay period for areas of high traffic to avoid degraded coverage when the number of mobile devices is changing rapidly.

When the delay period has passed, method 400 proceeds with deactivating components of the radiating point for the service (block 412). For example, the power amplifier(s) and any signal processing related to the inactive service can be deactivated to conserve power. Further, in some examples, fans or other components of the radiating point can be deactivated depending on the circumstances. In some examples, the speed of the internals fans is adjusted based on the number of active power amplifiers in the radiating point. For example, if no power amplifiers in the radiating point are active, then the speed of the internal fans is reduced to a level such that cooling can still be provided for the other active components. Similarly, if one or more power amplifiers are activated, the speed of the internal fans is increased such that sufficient cooling is provided for the heat generated by the activate power amplifiers.

Method 400 optionally includes switching to the next service supported by the system (block 414) and repeating blocks 402-412 for the next service supported by system. In some examples, the switching sequence that determines the next service is predetermined (for example, by the owner of the system or the network operator). In some examples, the next service can be determined based on a prioritization scheme where certain services are given higher priority than others. For example, the service of the owner of the system is selected more frequently for measurement if it is inactivated.

While the example method 400 in FIG. 4 refers to determining a number of mobile devices for a service in the coverage area of a radiating point, the present application is not limited to this implementation. In some other examples, the method 400 includes determining a bandwidth utilization for a service based on uplink signals from the coverage in addition to (or instead of) determining the number of mobile devices.

In an ideal scenario, only needed downlink signals for active services supported by the DAS 100 or C-RAN system 300 that have mobile devices 108, 308 in the coverage areas of the radiating points would be provided. However, it is likely that the mobile devices 108, 308 will not communicate uplink signals (for example, initiate a random access procedure) with the C-RAN system 300 or a base station 106 via the DAS 100 unless the mobile devices 108 receive some downlink signals. Therefore, it may not be feasible to completely shut off downlink signals for services supported by the DAS 100 or C-RAN system 300 that are deactivated.

Figure 5:
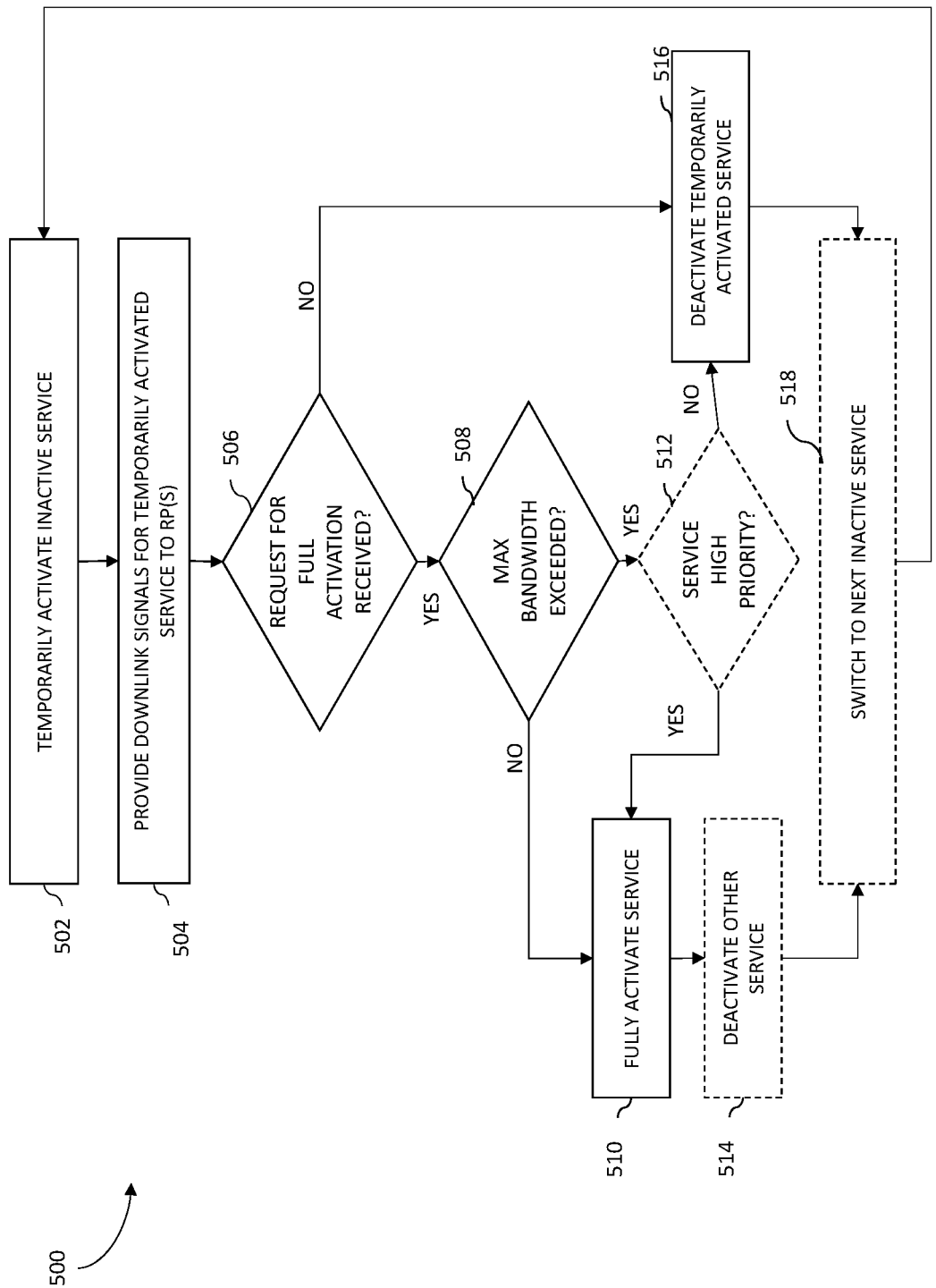
FIG. 5 is a flow diagram of an example method for providing test downlink signals to remote antenna units of a distributed antenna system.

FIG. 5 is a flow diagram of an example method 500 for providing test downlink signals to radiating points of a system. The common features discussed above with respect to DAS 100 and C-RAN system 300 in FIGS. 1-3 and method 400 in FIG. 4 can include similar characteristics to those discussed with respect to method 500 and vice versa. In some examples, method 500 can be performed by one or more processors in the master unit of a DAS or the controller of a C-RAN system.

Method 500 includes temporarily activating an inactivate service supported by the system (block 502). In some examples, the central unit of the system is configured to temporarily activate a single inactive service at a time. In other examples, the central unit of the system can be configured to temporarily activate more than one inactive service at a time when possible (for example, if the amount of available transport bandwidth is sufficient to provide downlink signals for multiple temporarily activated services). In some examples, an inactive service is temporarily activated by activating the signal path and processing for signals of the respective inactive service in the central unit and radiating points of the system.

Method 500 further includes providing downlink signals for the temporarily activated service to one or more radiating points (block 504). In some examples, providing downlink signals includes providing the entire frequency band for the respective temporarily activated service. In other examples, providing downlink signals includes providing less than an entire frequency band for the respective temporarily activated service. In such examples, only the portion of the frequency band for the respective service that is necessary to trigger the initial access procedure of the mobile devices is provided. In some examples, the central unit of a system is configured to determine which portion of the frequency band triggers the initial access procedure of the mobile devices. For example, where the system is a DAS, the master unit of the DAS is configured to determine which portion of the frequency band triggers the initial access procedure of the mobile devices by decoding the downlink signals for the temporarily activated service. In other examples, the central unit of the system is configured to receive information regarding the portion of the frequency band triggers the initial access procedure of the mobile devices from the base station or the network operator.

In some examples, the radiating points determine when the temporarily activated service should be fully activated. For example, the radiating points can make such a determination using the method 400 described above with respect to FIG. 4. In some examples, a time period for determining whether the temporarily activated service should be activated is implemented by the owner/operator of the system, which determines how long the central unit waits to see if any radiating points request that the temporarily activated service be fully activated. The time period can be on the order of seconds to minutes depending on the situation. In some examples, the time period corresponds to the delay period discussed above with respect to FIG. 4.

Method 500 proceeds with determining whether a request for fully activating the temporarily activated service has been received (block 506). When a request for full activation of the temporarily activated service is received, the method 500 proceeds with determining whether the maximum bandwidth for transport over the communication link between the radiating point and the central unit would be exceeded if the temporarily inactive service were activated (block 508). When the maximum bandwidth for transport over the communication link would not be exceeded, then the method 500 proceeds with fully activating the service (block 510). In some examples, fully activating the service includes activating the components of the central unit in the signal path for the service such that the entire frequency band for the service can be provided and sending an instruction to the radiating point to activate components in the signal path for the service. In some examples, the central unit sends instructions to activate components in the signal path for the service to multiple radiating points in close proximity to one another based on a request from a single radiating point. This can be advantageous in deployments scenarios (for example, highway or railway corridors) where the mobile devices are moving quickly and it is likely that radiating points in close proximity will be required to activate the same services.

In some examples, when the maximum bandwidth for transport over the communication link would be exceeded, then method 500 optionally proceeds with determining whether the temporarily activated service has a high enough priority to be activated (block 512). In some examples, this determination includes comparing the number of mobile devices, bandwidth utilization, or power level for the temporarily activated service with other active services. If the number of mobile devices, bandwidth utilization, or power level for the temporarily activated service is greater than an active service, then the temporarily active service is determined to have higher priority. In some examples, the determination includes using a prioritization list or scheme established by the system owner or operator.

When the temporarily activated service has high enough priority, then the temporarily activated service is fully activated (block 510). In some examples, method 500 includes deactivating another active service with lower priority than the temporarily activated service (block 514). In some examples, deactivating the other activated service with lower priority includes deactivating the components of the central unit in the signal path for that service and sending an instruction to the radiating point to deactivate components in the signal path for that service.

When a request for fully activating the temporarily activated service is not received or the temporarily activated service does not have high enough priority, method 500 proceeds with deactivating the temporarily activated service (block 516). In some examples, deactivating the temporarily activated service includes deactivating the components of the central unit in the signal path for the service and sending an instruction to the radiating point to deactivate components in the signal path for the temporarily activated service. For example, the power amplifier(s) and any signal processing related to the inactive service can be deactivated to conserve power.

Method 500 optionally includes switching to the next inactive service supported by the system (block 518) and repeating blocks 502-516 for the next inactive service. In some examples, the switching sequence that determines the next inactive service is predetermined (for example, by the owner of the system or the network operator). In some examples, the next service can be determined based on a prioritization scheme where certain services are given higher priority than others. For example, the service of the owner of the system is selected more frequently for measurement if it is inactivated.

Method 500 proceeds with repeating block 502-518 during operation of the system. Method 500 can be executed at predetermined intervals, which can be selected by the operator of the system. For example, the central unit of the system can be configured to temporarily activate an inactive service for the system on the order of seconds or minutes. Other intervals could also be used.

Some of the examples described herein can be used to reduce the cost of a DAS or C-RAN system in multiple ways. In some examples, the amount of transport bandwidth can be reduced compared to current DAS or C-RAN system implementations such that lower cost transceivers (for example, optical or Ethernet transceivers) can be used in the master unit of the DAS or controller of the C-RAN system. In some examples, the DAS or C-RAN system can be configured to reduce power consumption of components of the DAS or C-RAN system during operation when services are inactive. For example, when some services supported by the DAS or C-RAN system are not active for particular radiating points, the particular radiating points can be deactivated or switched to a low power mode (for example, deactivate power amplifiers for the inactive services, reduce transmission power, reduce speed of cooling fans, or the like) to reduce power consumption.

The examples described herein can be applied to many different deployment scenarios where a large variety of subscribers is expected but the throughput requirements are moderate. In some examples, a large variety of subscribers can include customers of all available operators with contracts for the different services supported by the DAS or C-RAN system. Some example deployment scenarios where the above systems and methods could be most effective include public buildings, hotels, highway or railway corridors, or the like. Deployment scenarios where maximum throughput is needed (for example, sports arena or outdoor stadium) may benefit more from expensive transceivers, but the above examples can still provide a cost reduction in terms of power consumption.

In various aspects, system elements, method steps, or examples described throughout this disclosure (such as the radiating points, central units, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: a central unit; a plurality of radiating points communicatively coupled to the central unit and located remotely from the central unit, wherein each respective radiating point includes a detector configured to: evaluate uplink signals received from a coverage area of the respective radiating point; determine which services of a plurality of services supported by the system are needed and which services of the plurality of services supported by the system are not needed based on the evaluation of the uplink signals; and send a request, to the central unit, to activate a service determined to be needed.

Example 2 includes the system of Example 1, wherein the detector is configured to: determine a number of mobile devices in a coverage area of the respective radiating point for each service of a plurality of services supported by the system based on received uplink signals from the coverage area; determine whether the number of mobile devices in the coverage area of the respective radiating point for each service of the plurality of services supported by the system exceeds a threshold; and request activation of a respective service of the plurality of services supported by the system when the number of mobile devices in the coverage area for the respective service exceeds the threshold.

Example 3 includes the system of any of Examples 1-2, wherein the detector comprises a Received Signal Strength Indicator (RSSI) detector.

Example 4 includes the system of any of Examples 1-3, wherein the detector comprises: a measurement receiver configured to measure a signal power of an uplink signal in an uplink signal path of the respective radiating point for each service; a comparator having an input communicatively coupled to the measurement receiver, wherein the comparator is configured to compare the measured uplink signal power of the uplink signal received from the measurement receiver for each service with a threshold uplink signal power, wherein the comparator is configured to output a signal that is indicative of whether the measured uplink signal power for each service exceeds the threshold uplink signal power; and one or more processors communicatively coupled to an output of the comparator, wherein the one or more processors are configured to estimate a bandwidth utilization and/or a number of mobile devices in a coverage area of the respective radiating point for each service based on the signal output from the comparator.

Example 5 includes the system of any of Examples 1-4, wherein the detector comprises a digital signal decoder configured to decode the received uplink signals, wherein the digital signal decoder is configured to compare the decoded uplink signals to known signals to determine a bandwidth utilization and/or a number of mobile devices in the coverage area of the respective radiating point for each service supported by the system.

Example 6 includes the system of any of Examples 1-5, wherein the central unit is configured to: temporarily activate a service that has been determined to be not needed; transmit downlink signals for the temporarily activated service to the radiating point; fully activate the temporarily activated service in response to a request for full activation of the temporarily activated service from the radiating point; deactivate the temporarily activated service if no request for full activation of the temporarily activated service is received from the radiating point.

Example 7 includes the system of Example 6, wherein the central unit is configured to transmit an entire frequency band for the temporarily activated service supported by the system.

Example 8 includes the system of any of Examples 6-7, wherein the central unit is configured to transmit less than an entire frequency band for the temporarily activated service supported by the system.

Example 9 includes the system of Example 8, wherein the central unit is configured to determine a portion of the frequency band for the temporarily activated service supported by the system that is used to trigger an initial access procedure for mobile devices.

Example 10 includes the system of any of Examples 8-9, wherein the central unit is configured to receive information from a network operator identifying a portion of the frequency band for the temporarily activated service supported by the system that is used to trigger an initial access procedure for mobile devices.

Example 11 includes the system of any of Examples 1-10, wherein the central unit is configured to sequentially test services that have been determined to be not needed during operation.

Example 12 includes the system of any of Examples 1-11, wherein the central unit is configured to activate a service at a first radiating point and a second antenna unit of the plurality of radiating points based on the request to activate the service determined to be needed sent by the first radiating point of the plurality of radiating points.

Example 13 includes the system of any of Examples 1-12, wherein the system comprises a distributed antenna system, wherein the central unit is a master unit configured to be coupled to a base station, wherein the plurality of radiating points comprises a plurality of remote antenna units.

Example 14 includes the system of any of Examples 1-12, wherein the system comprises a cloud radio access network system, wherein the central unit is a controller, wherein the plurality of radiating points comprises a plurality of radio points.

Example 15 includes a central unit of a system, comprising: a transport interface configured to be coupled to a radiating point, wherein the central unit is configured to support a plurality of services, wherein the central unit is configured to: temporarily activate a service that is currently inactive; transmit downlink signals for the temporarily activated service to the radiating point; fully activate the temporarily activated service in response to a request for full activation of the temporarily activated service from the radiating point; deactivate the temporarily activated service if no request for full activation of the temporarily activated service is received from the radiating point.

Example 16 includes the central unit of Example 15, wherein the central unit is configured to transmit the entire frequency band for the temporarily activated service supported by the system.

Example 17 includes the central unit of any of Examples 15-16, wherein the central unit is configured to transmit less than an entire frequency band for the respective service supported by the system.

Example 18 includes the central unit of Example 17, wherein central unit is configured to transmit only a portion of the frequency band for the respective service supported by the system that is used to trigger an initial access procedure for mobile devices.

Example 19 includes the central unit of Example 18, wherein the central unit is configured to determine the portion of the frequency band for the respective service supported by the system that is used to trigger an initial access procedure for mobile devices.

Example 20 includes the central unit of any of Examples 18-19, wherein the central unit is configured to receive information from a network operator identifying the portion of the frequency band for the respective service supported by the system that is used to trigger an initial access procedure for mobile devices.

Example 21 includes the central unit of any of Examples 15-20, wherein the central unit is configured to sequentially test currently inactive services during operation.

Example 22 includes the central unit of any of Examples 15-21, wherein the central unit is a master unit of a distributed antenna system, wherein the master unit further comprises an interface configured to be coupled to a base station.

Example 23 includes the central unit of any of Examples 15-21, wherein the central unit is a controller of a cloud radio access network.

Example 24 includes a radiating point of a system, comprising: a transport interface configured to communicate signals with a central unit of the system, wherein the radiating point is configured to be communicatively coupled to the central unit and located remotely from the central unit; a detector configured to: evaluate uplink signals received from a coverage area of the radiating point; determine which services of a plurality of services supported by the system are needed and which services of the plurality of services supported by the system are not needed based on the evaluation of the uplink signals; and send a request, to the central unit, to activate the services determined to be needed.

Example 25 includes the radiating point of Example 24, wherein the detector is configured to: determine a number of mobile devices in a coverage area of the respective radiating point for each service of a plurality of services supported by the system based on received uplink signals from the coverage area; determine whether the number of mobile devices in the coverage area of the respective radiating point for each service of the plurality of services supported by the system exceeds a threshold; and request activation of a respective service of the plurality of services supported by the system when the number of mobile devices in the coverage area for the respective service exceeds the threshold.

Example 26 includes the radiating point of any of Examples 24-25, wherein the detector comprises a Received Signal Strength Indicator (RSSI) detector.

Example 27 includes the radiating point of any of Examples 24-26, wherein the detector comprises: a measurement receiver configured to measure a signal power of an uplink signal in an uplink signal path of the respective radiating point for each service; a comparator having an input communicatively coupled to the measurement receiver, wherein the comparator is configured to compare the measured uplink signal power of the uplink signal received from the measurement receiver for each service with a threshold uplink signal power, wherein the comparator is configured to output a signal that is indicative of whether the measured uplink signal power for each service exceeds the threshold uplink signal power; and one or more processors communicatively coupled to an output of the comparator, wherein the one or more processors are configured to estimate a bandwidth utilization and/or a number of mobile devices in a coverage area of the respective radiating point for each service based on the signal output from the comparator.

Example 28 includes the radiating point of any of Examples 24-27, wherein the detector comprises a digital signal decoder configured to decode the received uplink signals, wherein the digital signal decoder is configured to compare the decoded uplink signals to known signals to determine a bandwidth utilization and/or a number of mobile devices in the coverage area of the respective radiating point for each service supported by the system.

Example 29 includes the radiating point of any of Examples 24-28, wherein the radiating point is a remote antenna unit of a distributed antenna system.

Example 30 includes the radiating point of any of Examples 24-28, wherein the radiating point is a radio point of a cloud radio access network system.

Example 31 includes a detector, comprising: a measurement receiver configured to measure a power level of signals coupled from a communication path, wherein the measurement receiver is configured to output a voltage signals indicative of the power level of the signals; a comparator configured to generate output signals based on a comparison of the voltage signals from the measurement receiver with a threshold power level, wherein a voltage signal above the threshold power level is indicative of a utilized state and a voltage below the threshold power level is indicative of an idle state; one or more processors configured to estimate bandwidth utilization based on the output signals from the comparator.

Example 32 includes the detector of Example 31, wherein the threshold power level is fixed.

Example 33 includes the detector of any of Examples 31-32, wherein the threshold power level is adjustable.

Example 34 includes the detector of any of Examples 31-33, wherein the detector is coupled to a downlink signal path, wherein the signals are downlink signals coupled from the downlink signal path.

Example 35 includes the detector of any of Examples 31-34, wherein the detector is coupled to an uplink signal path, wherein the signals are uplink signals coupled from the uplink signal path.

Example 36 includes the detector of any of Examples 31-35, wherein the detector is positioned in a master unit or a remote antenna unit of a distributed antenna system.

Example 37 includes the detector of any of Examples 31-35, wherein the detector is positioned in a controller or a radio point of a cloud radio access network.

Example 38 includes the detector of any of Examples 31-37, wherein the one or more processors are further configured to determine whether the signals are noise or interference based on a determination of whether a length of the signal exceeds a threshold.

Example 39 includes a detector, comprising: an interface configured to receive digital signals from a communication path; and a processing device configured to: determine a power level of the digital signals; compare the power level of the digital signals with a threshold power level, wherein a power level above the threshold power level is indicative of a utilized state and a power level below the threshold power level is indicative of an idle state; estimate bandwidth utilization based on the comparison of the power level of the digital signals with the threshold power level.

Example 40 includes the detector of Example 39, wherein the threshold power level is fixed.

Example 41 includes the detector of any of Examples 39-40, wherein the threshold power level is adjustable.

Example 42 includes the detector of any of Examples 39-41, wherein the detector is coupled to a downlink signal path, wherein the signals are downlink signals coupled from the downlink signal path.

Example 43 includes the detector of any of Examples 39-42, wherein the detector is coupled to an uplink signal path, wherein the signals are uplink signals coupled from the uplink signal path.

Example 44 includes the detector of any of Examples 39-43, wherein the detector is positioned in a master unit or a remote antenna unit of a distributed antenna system.

Example 45 includes the detector of any of Examples 39-43, wherein the detector is positioned in a controller or a radio point of a cloud radio access network.

Example 46 includes the detector of any of Examples 39-45, wherein the one or more processors are further configured to determine whether the digital signals represent noise or interference based on a determination of whether a length of the digital signals exceeds a threshold.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
a central unit;
a plurality of radiating points communicatively coupled to the central unit and located remotely from the central unit, wherein each respective radiating point includes a detector configured to:
evaluate uplink signals received from a coverage area of the respective radiating point;

determine which services of a plurality of services supported by the system are needed and which services of the plurality of services supported by the system are not needed based on the evaluation of the uplink signals, wherein each service of the plurality of services supported by the system corresponds to a signal transmitted by the system; and send a request, to the central unit, to activate a service determined to be needed.

2. The system of claim 1, wherein the central unit is configured to:

temporarily activate a service that has been determined to be not needed;

transmit downlink signals for the temporarily activated service to the radiating point;

fully activate the temporarily activated service in response to a request for full activation of the temporarily activated service from the radiating point;

deactivate the temporarily activated service if no request for full activation of the temporarily activated service is received from the radiating point.

3. The system of claim 1, wherein the central unit is configured to activate a service at a first radiating point and a second radiating point of the plurality of radiating points based on the request to activate the service determined to be needed sent by the first radiating point of the plurality of radiating points.

4. The system of claim 1, wherein the system comprises a distributed antenna system, wherein the central unit is a master unit configured to be coupled to a base station, wherein the plurality of radiating points comprises a plurality of remote antenna units.

5. The system of claim 1, wherein the system comprises a cloud radio access network system, wherein the central unit is a controller, wherein the plurality of radiating points comprises a plurality of radio points.

6. A central unit of a system, comprising:

a transport interface configured to be coupled to a radiating point, wherein the central unit is configured to support a plurality of services, wherein each service of the plurality of services supported by the system corresponds to a signal transmitted by the system;

wherein the central unit is configured to:

temporarily activate a service that is currently inactive;

transmit downlink signals for the temporarily activated service to the radiating point;

fully activate the temporarily activated service in response to a request for full activation of the temporarily activated service from the radiating point;

deactivate the temporarily activated service if no request for full activation of the temporarily activated service is received from the radiating point.

7. The central unit of claim 6, wherein the central unit is configured to transmit an entire frequency band for the temporarily activated service supported by the system.

8. The central unit of claim 6, wherein the central unit is configured to transmit less than an entire frequency band for the respective service supported by the system.

9. The central unit of claim 8, wherein central unit is configured to transmit only a portion of the entire frequency band for the respective service supported by the system that is used to trigger an initial access procedure for mobile devices.

10. The central unit of claim 9, wherein the central unit is configured to determine the portion of the entire frequency band for the respective service supported by the system that is used to trigger an initial access procedure for mobile devices; or receive information from a network operator identifying the portion of the frequency band for the respective service supported by the system that is used to trigger an initial access procedure for mobile devices.

11. The central unit of claim 6, wherein the central unit is configured to sequentially test currently inactive services during operation.

12. The central unit of claim 6, wherein the central unit is a master unit of a distributed antenna system, wherein the master unit further comprises an interface configured to be coupled to a base station.

13. The central unit of claim 6, wherein the central unit is a controller of a cloud radio access network.

14. A radiating point of a system, comprising:

a transport interface configured to communicate signals with a central unit of the system, wherein the radiating point is configured to be communicatively coupled to the central unit and located remotely from the central unit;

a detector configured to:

evaluate uplink signals received from a coverage area of the radiating point;

determine which services of a plurality of services supported by the system are needed and which services of the plurality of services supported by the system are not needed based on the evaluation of the uplink signals, wherein each service of the plurality of services supported by the system corresponds to a signal transmitted by the system; and send a request, to the central unit, to activate the services determined to be needed.

15. The radiating point of claim 14, wherein the detector is configured to:

determine a number of mobile devices in a coverage area of the respective radiating point for each service of a plurality of services supported by the system based on received uplink signals from the coverage area;

determine whether the number of mobile devices in the coverage area of the respective radiating point for each service of the plurality of services supported by the system exceeds a threshold; and request activation of a respective service of the plurality of services supported by the system when the number of mobile devices in the coverage area for the respective service exceeds the threshold.

16. The radiating point of claim 14, wherein the detector comprises a Received Signal Strength Indicator (RSSI) detector.

17. The radiating point of claim 14, wherein the detector comprises:

a measurement receiver configured to measure a signal power of an uplink signal in an uplink signal path of the respective radiating point for each service;

a comparator having an input communicatively coupled to the measurement receiver, wherein the comparator is configured to compare the measured uplink signal power of the uplink signal received from the measurement receiver for each service with a threshold uplink signal power, wherein the comparator is configured to output a signal that is indicative of whether the measured uplink signal power for each service exceeds the threshold uplink signal power; and one or more processors communicatively coupled to an output of the comparator, wherein the one or more processors are configured to estimate a bandwidth utilization and/or a number of mobile devices in a coverage area of the respective radiating point for each service based on the signal output from the comparator.

18. The radiating point of claim 14, wherein the detector comprises a digital signal decoder configured to decode the received uplink signals, wherein the digital signal decoder is configured to compare the decoded uplink signals to known signals to determine a bandwidth utilization and/or a number of mobile devices in the coverage area of the respective radiating point for each service supported by the system.

19. The radiating point of claim 14, wherein the radiating point is a remote antenna unit of a distributed antenna system.

20. The radiating point of claim 14, wherein the radiating point is a radio point of a cloud radio access network system.

* * * * *